Nov. 13, 1934.  F. M. VANDERVOORT  1,980,644
GEAR SHIFTING MECHANISM
Filed June 29, 1931  5 Sheets—Sheet 1

INVENTOR
BY FRANCIS M. VANDERVOORT.
Richey & Watt ATTORNEY

INVENTOR
BY Francis M. Vandervoort.
Richey & Watts ATTORNEY

First Speed.

Second Speed.

Third Speed.

Fourth Speed.

Fifth Speed.

Reverse.

Patented Nov. 13, 1934

1,980,644

UNITED STATES PATENT OFFICE 1,980,644

GEAR SHIFTING MECHANISM

Francis M. Vandervoort, Cleveland, Ohio, assignor to The White Motor Company, Cleveland, Ohio, a corporation of Ohio Application June 29, 1931, Serial No. 547,632

12 Claims. (Cl. 74—477)

This invention relates to change speed transmissions for motor vehicles and particularly to a gear shifting mechanism.

The principal object of this invention is to provide an improved and simplified arrangement for shifting the gears or clutches of a transmission.

Another object is to provide a simplified shifting mechanism to selectively actuate a plurality of shifting forks. Other objects of the invention are to simplify the construction of the shifting mechanism; to provide an improved arrangement for coupling the hand lever with an actuating shaft; and to mount a plurality of shifter forks on a single actuating shaft for selective operation.

Other objects relating to details of construction and economies of manufacture will appear hereinafter.

In the accompanying drawings which illustrate a preferred embodiment of the invention:

Figure 1:
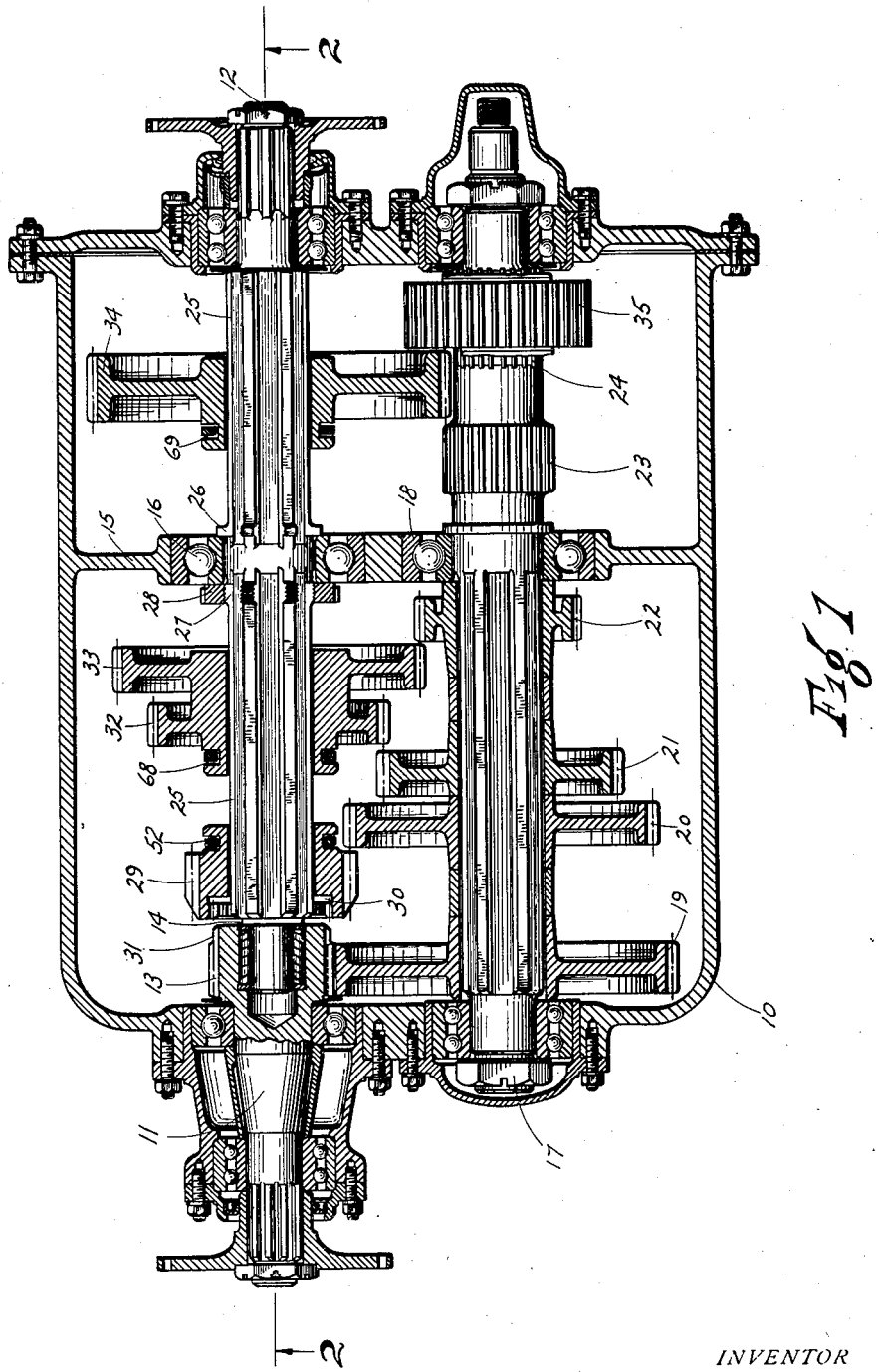
Figure 1 is a horizontal sectional view through a transmission showing the driving shaft, the driven shaft and the countershaft.

Referring to the drawings the numeral 10 designates a transmission housing. A driving shaft 11 arranged to be coupled to the engine of the vehicle through the usual releasable clutch is journalled in one end of the housing 10. A driven shaft 12 arranged to transmit power to the vehicle wheels is journalled in the other end of the casing and is arranged in axial alignment with the driving shaft 11. The inner end of the driving shaft 11 is formed with an integral gear 13 and is counterbored as indicated at 14 to receive the extended end of the driven shaft 12. The housing 10 is formed with an integral web 15 which carries a bearing 16 to support the driven shaft 12 intermediate its length.

A countershaft 17, disposed in substantially the same horizontal plane as the driving shaft 11 and driven shaft 12 and spaced laterally from these shafts, is journalled in each end of the casing and is supported intermediate its length by a bearing 18 carried by the web 15. The countershaft 17 is formed with splines extending from the bearing 18 to the forward end of the shaft, and a plurality of gears 19, 20, 21 and 22 are rigidly carried on the splined portion of the shaft. Between the bearing 18 and the rear end, the countershaft 17 is formed with integral gears 23 and 24.

The driven shaft 12 is formed with splines 25 extending toward each end from the bearing 16. The splines on the rear end of the shaft 12 are upset as indicated at 26 to form abutments for the bearing 16 and the splines on the forward end of the shaft are upset and screw threaded as shown at 27 to receive a ring 28 which firmly clamps the bearing 16 against the abutments 26. A gear 29 is slidably mounted on the splines 25 at the forward end of the shaft 12 and is provided with internal clutch teeth 30. This gear is arranged to be slid into engagement with the gear 20 on the countershaft 17 or to be moved forwardly so that the clutch teeth 30 engage with co-operating clutch teeth 31 formed on the gear 13 to directly couple the driving shaft 11 and the driven shaft 12. A pair of gears 32 and 33 are secured together and arranged to slide as a unit on the splines 25 of the driven shaft 12 between the gear 29 and the bearing 16. The gear 32 is arranged to mesh with the gear 21 on the countershaft and the gear 33 is arranged to mesh with the gear 22 on the countershaft. A gear 34 is slidably mounted on the splines 25 at the rear end of the driven shaft 12 and is arranged to mesh with gear 23 on the countershaft or with an idler gear 35 journalled in the casing 10 and in constant mesh with the gear 24 on the countershaft.

The gear 19 on the countershaft is in constant mesh with the gear 13 on the inner end of the driving shaft 11. When the gear 34 is moved forwardly into mesh with the gear 23 on the countershaft the driven shaft 12 will be rotated at first or low speed. When the gear 34 is moved rearwardly into engagement with the reverse idler 35 the driven shaft 12 will be rotated in the opposite direction from the driving shaft 11. When the gear 33 meshes with the gear 22 on the countershaft, the driven shaft 12 will be rotated in second speed. Similarly engagement of the gear 32 with the gear 21 will give third speed, engagement of the gear 29 with the gear 20 will give fourth speed, and engagement of the clutch teeth 30 on the gear 29 with the clutch teeth 31 on the gear 13 will set the transmission in fifth or direct speed.

Figure 2:
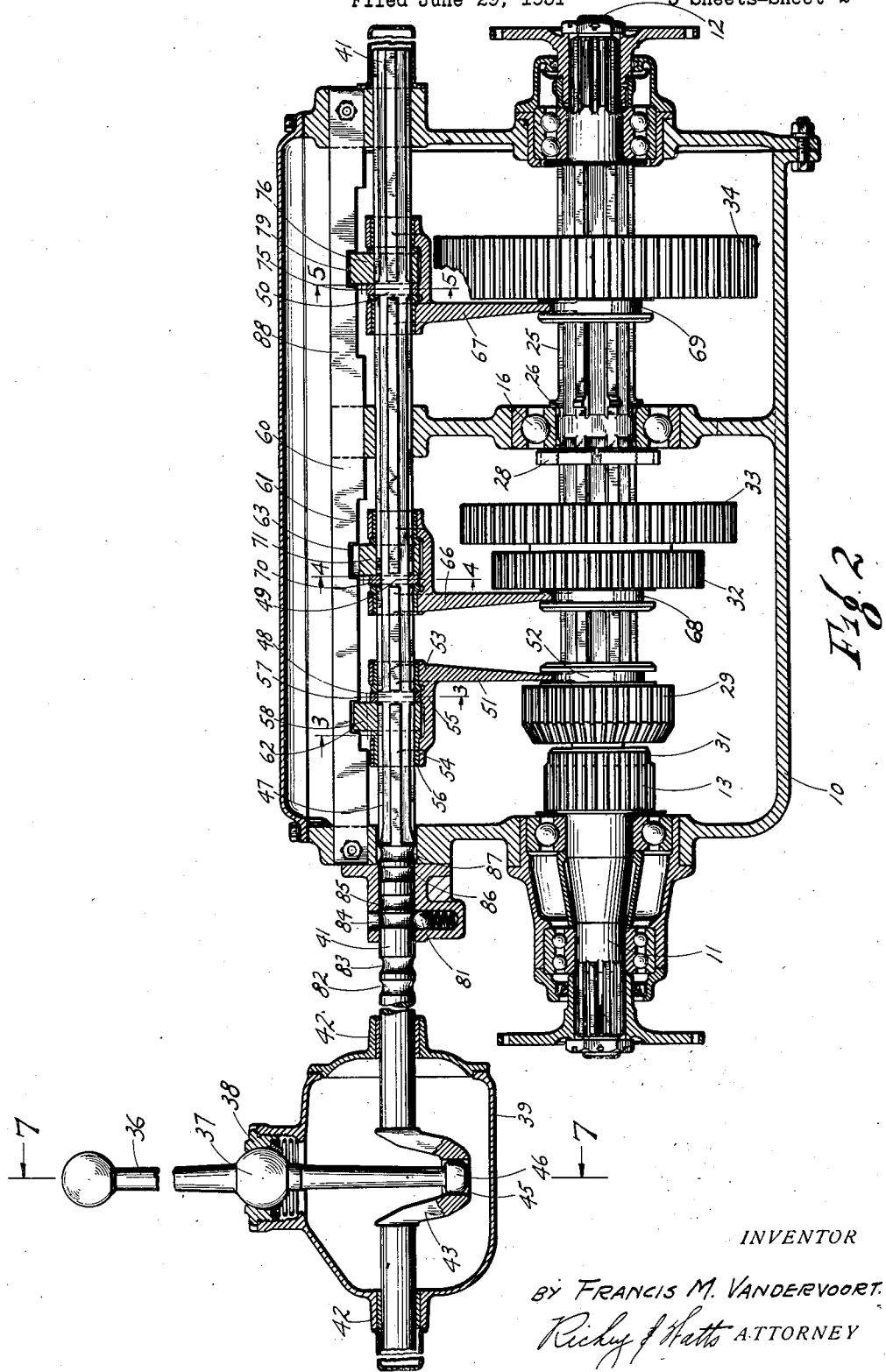
Figure 2 is a vertical section taken substantially on a plane indicated by the line 2—2 of Figure 1, and in addition showing a vertical sectional view of the hand lever and its connection to the actuating shaft.

The shifting means for the various slidable gears is shown in assembled relation in Figure 2 and certain details thereof are illustrated in Figures 3 to 7 inclusive. A hand lever 36 projects upwardly through the floor of the vehicle into the driver's compartment in the usual manner. Near its lower end the lever 36 is provided with an integral ball 37 which is universally pivoted in a socket 38 secured in the upper wall of a small casing 39. Preferably the hand lever extends upwardly through a guide plate 40 secured to the floor of the vehicle (see Figure 6) and formed with six recesses for receiving the hand lever designated 1 to 5 inclusive and R. A shaft 41 is slidably and rotatably journalled in the opposite ends of the casing 39 as indicated at 42 and is extended rearwardly and journalled in the opposite ends of the transmission housing 10. The shaft 41 extends through the housing 10 substantially directly above and parallel with the drive shaft 11 and the driven shaft 12. Within the casing 39 and below the socket 38 the shaft 41 is formed with a crank 43 having a horizontal portion 44 (see Figures 2 and 7). The horizontal portion 44 is provided with a bore 45 arranged radially with respect to the shaft 41. The lower end of the lever 36 is formed with a ball 46 slidably bearing within the bore 45. It will be evident that with this arrangement rocking movement of the hand lever 36 about an axis parallel to the shaft 41, will effect a corresponding rocking movement of the shaft 41, the difference between the arcs of movement of the ball 46 and the horizontal portion 44 being accommodated by sliding movement of the ball 46 within the bore 45. Similarly, rocking movement of the hand lever 36 about an axis perpendicular to the axis of the shaft 41 effects sliding movement of the shaft 41 in its bearings, so that when the upper end of the hand lever 36 is pulled rearwardly the shaft 41 is pushed forwardly in its bearings, and vice versa.

Within the transmission housing 10 the shaft 41 is formed with four splines 47 equally spaced about the shaft and of relatively small angular extent. The splines are interrupted at three spaced points to form the three lands 48, 49 and 50 which have an external diameter equal to the diameter of the shaft at the base of the splines 47. A fork 51 which straddles the gear 29 and fits into a groove 52 formed therein is slidably and rotatably mounted on the peripheries of the splines 47. The upper end of the fork 51 is formed with spaced bearing loops 53 and 54 connected by an arm 55 which extends below the shaft 41. The loops 53 and 54 are provided with bushings 56 which have an internal diameter slightly greater than the external diameter of the splines 47 and which bear freely thereon. Collars 57 and 58 encircle the shaft 41 between the loops 53 and 54 and abut the ends of the bushings 56.

Figure 3:
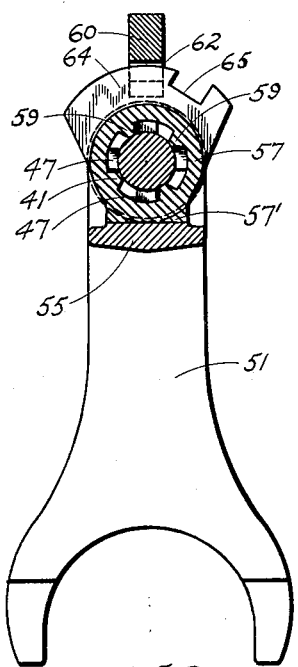
Figure 3 is a section taken on the line 3—3 of Figure 2.

As shown most clearly in Figure 3 the collar 57 is provided with an extended flat face 57' abutting the arm 55 so that the collar 57 is held against rotation with respect to the fork 51. The collar 57 is formed interiorly with four equally spaced inward projections 59 of substantially the same depth as the splines 47 and having an angular extent equal to about half the angular extent of the spaces between the splines 47. These projections 59 are designed to bear on the land 48 or to pass between the splines 47. The axial length of the collar 57 is slightly less than the axial extent of the land 48 so that the projections 59 may pass between the spaced ends of the splines 47 on opposite sides of the land 48. The collar 58 is of greater axial length than the axial extent of the land 48 and is formed with grooves fitting the splines 47 so that the collar 58 is held against rotation with respect to the shaft 41 in all positions of the shaft.

A bar 60 is secured to the opposite ends of the housing 10 and extends parallel with and directly above the shaft 41. The under surface of the bar 60 is formed with a relatively long notch 61 and a pair of shorter notches 62 and 63 in the base of the notch 61. The notch 62 is of substantially the same length as the collar 58 and is arranged to receive an arcuate projection 64 extending upwardly from the collar 58. The projection 64 is formed with a notch 65 of proper dimensions to receive the bar 60 so that when the shaft 41 and the collar 58 are turned to bring the notch 65 into registration with the bar 60 the collar 58 is permitted to slide with respect to the bar 60. When the shaft 41 is turned so that the notch 65 is out of registry with the bar 60 the engagement of the projection 64 in the notch 62 prevents sliding movement of the collar 58.

Two other forks 66 and 67 are mounted on the shaft 41 in substantially the same manner as the fork 51 and are arranged to shift the other two shiftable members on the driven shaft 12. The fork 66 fits into a groove 68 formed in the double gears 32, 33 and the fork 67 fits into a groove 69 formed in the gear 34. The fork 66 is provided with a pair of collars 70 and 71 corresponding to the collars 57 and 58 respectively of the fork 51. The collar 70 is provided with internal projections 72 arranged to bear on the land 49 and corresponding to the projections 59 on the collars 57, except that the projections 72 are angularly spaced about the shaft 41 from the projections 59 a distance substantially equal to the angular extent of the splines 47. The collar 71 is held against rotation with respect to the shaft 41 by the splines 47 and is provided with an arcuate projection 73 fitting into the notch 63 in the bar 60 and having a notch 74 arranged to register with the bar 60 to permit sliding movement of the collar 71. The notch 74 is spaced about the shaft 41 from the notch 65 an angular distance equal to the spacing of the projections 72 and 59 and in the opposite direction. The fork 67 is similarly mounted on the shaft 41 and has disposed between its spaced bearings a pair of collars 75 and 76 corresponding with the collars 57 and 58 respectively. The collar 75 is provided with internal projections 77 corresponding with the projections 59 and 72, but spaced angularly about the shaft 41 from the projections 72 a distance substantially equal to the angular extent of the splines 47. These projections 77 are arranged to bear on the land 50 of the shaft 41. The collar 76 is provided with an arcuate projection 78 fitting into a notch 79 in the bar 60 and having a notch 80 arranged to register with the bar 60. The notch 80 is spaced about the shaft 41 from the notch 74 an angular distance substantially equal to the angular spacing of the projections 72 and 77 but in the opposite direction.

Figure 4:
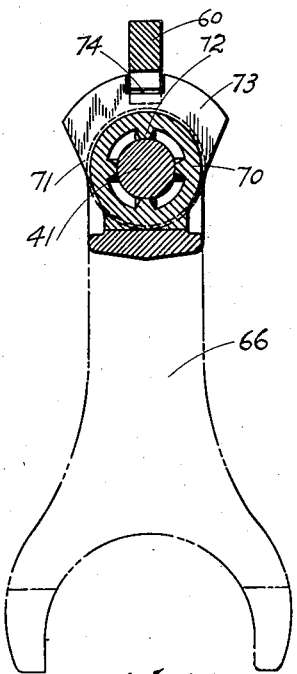
Figure 4 is a section taken on the line 4—4 of Figure 2.
Figure 5:
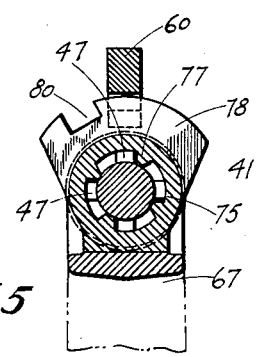
Figure 5 is a section taken on the line 5—5 of Figure 2.

The relative arrangement of the various collars on the three forks 51, 66 and 67 is shown most clearly in Figures 3, 4 and 5, in all of which the shaft 41 is shown in its angular neutral position. In Figure 3 the arcuate projection 64 is shown within the notch 62 with the notch 65 out of registry with the bar 60. Accordingly, the collar 57 is locked by the bar 60 against sliding movement with respect thereto and the fork 51 is also locked against sliding movement. The projections 59 upon the collar 57 are out of alignment with the splines 47 on the shaft 41 and the shaft may be slid therethrough, the projections 59 entering the spaces between the splines. In Figure 4 it will be seen that the notch 74 in the arcuate projection of the collar 71 is in registry with the bar 60 so that the collar 71 and the fork 66 are free to slide longitudinally with respect to the bar 60. The projections 72 on the collar 70 are disposed on the lands 49 directly between the spaced ends of the splines 47 so that sliding movement of the shaft 41 in either direction will cause the ends of the splines 47 to abut the projections 72 and slide the fork 66 with the shaft 41.

As seen in Figure 5 the notch 80 in the arcuate projection 78 of the collar 76 is out of registry with the bar 60 and the collar 76 and fork 67 are therefore locked against sliding movement with respect to the bar 60. The projections 77 on the collar 76 register with the spaces between the splines 47 so that the shaft 41 may slide through the collar 75.

Figure 6:
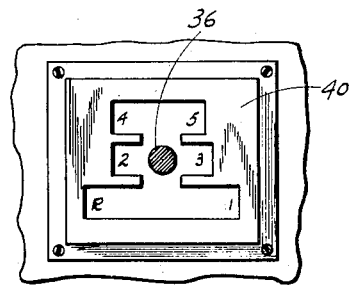
Figure 6 is a detail plan view of the guide plate for the hand lever.
Figure 7:
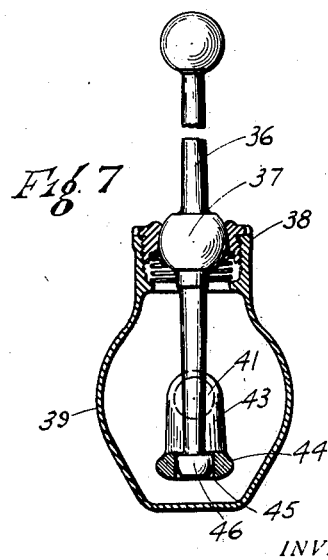
Figure 7 is a sectional view through the hand lever taken substantially on the line 7—7 of Figure 2.

The parts occupy the relative positions shown in Figures 2, 3, 4 and 5 when the crank 43 is in its lowermost position and the hand lever 36 is disposed in a vertical plane. In this position the hand lever 36 projects upwardly through the center of the guide plate 40 as shown in Figure 6 so that it is in alignment with the notches designated 2 and 3 in the plate 40. Rocking movement of the hand lever 36 about an axis perpendicular to the shaft 41 will cause the shaft 41 to slide longitudinally, carrying with it the fork 66; the forks 51 and 67 remaining in the positions shown in Figure 2.

Rocking movement of the shaft 41 caused by rocking of the hand lever about an axis parallel to the axis of the shaft 41 will cause each of the collars 58, 71 and 76 to rock with the shaft, the collars 57, 70 and 75 remaining stationary by reason of their engagement with the respective forks. As seen in Figures 3, 4 and 5 rocking movement of the shaft 41 in a clockwise direction will maintain the forks 51 and 66 locked against sliding movement and lock the fork 67 to the shaft 41 to slide therewith. As seen in Figure 3 such movement will not bring the notch 65 into registry with the bar 60 and will leave the projection 59 in the spaces between the splines 47. The notch 74 on the collar 71 will be moved out of registry with the bar 60, locking the fork 66 against sliding movement, and the splines 47 will be moved in a clockwise direction so that the projections 72 are in alignment with the spaces therebetween. The notch 80 in the collar 76, however, will be moved into registry with the bar 60 so that the fork 67 is free to slide with respect to the bar 60. The splines 47 will be moved so that the projections 77 on the collar 75 are in alignment therewith and between the spaced ends thereof so that subsequent sliding movement of the shaft 41 will result in corresponding sliding movement of the fork 67.

When the shaft 41 is rocked in a counter clockwise direction from the position shown in Figures 3, 4 and 5 the splines 47 will move into alignment with the projections 59 and into positions out of alignment with the projections 72 and 77. Similarly the notch 65 will be moved into registry with the bar 60 and the notches 74 and 80 will be moved into positions out of registry with the bar 60. Accordingly, the forks 66 and 67 will be locked against sliding movement and the fork 51 will be locked to the shaft 41 to slide therewith.

As shown in Figure 2 a spring pressed ball or plunger 81 is carried in the front end of the housing 10 and pressed against the shaft 41. This ball coacts with a plurality of grooves 82, 83, 84, 85, 86 and 87 to retain the shaft 41 in a plurality of different axial positions. When the ball 81 is in engagement with the groove 84 as shown in Figure 2 the shaft 41 is in its neutral position so that the projections 59, 72 and 77 on the collars 57, 70 and 75, respectively, bear upon the lands 48, 49 and 50.

Figure 8:
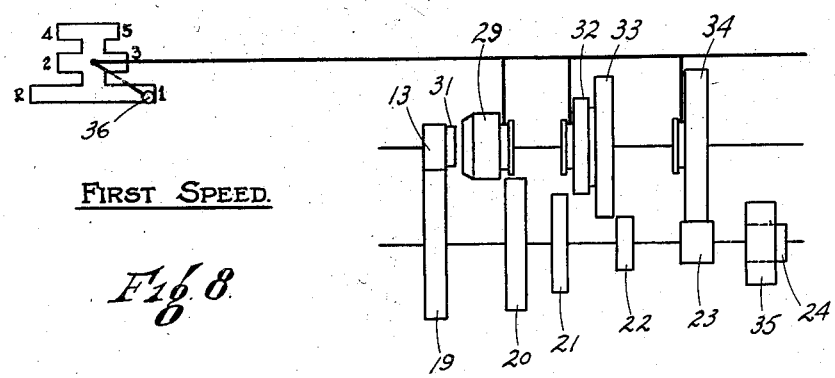
Figures 8 to 13 are diagrammatic views illustrating the relation of the parts in first to fifth speeds inclusive and reverse, respectively.

The operation of the transmission is illustrated diagrammatically in Figures 8 to 13 inclusive. As shown in Figure 8 the hand lever 36 is moved to the left and rearwardly into the recess marked 1 in order to set the transmission in first speed. The movement of the hand lever to the left rocks the shaft 41 in a clockwise direction (as seen in Figures 3, 4 and 5) which aligns the notch 80, with the bar 60, moves the notches 65 and 74 to positions out of registry with the bar 60, and moves the splines 47 to positions in which they are in alignment with the projections 77 and out of alignment with the projections 59 and 72. The movement of the hand lever rearwardly slides the shaft 41 forwardly and the splines 47 engage the projections 77 and slide between the projections 59 and 72. The notch 80 permits the collar 76 to slide along the bar 60 and the fork 67 is therefore moved forwardly with the shaft 41. The movement of the shaft 41 forwardly is continued until the ball 81 engages in the groove 87 at which time the gear 34 is fully meshed with the gear 23 and the arcuate projection 78 of the collar 76 engages the forward end of the relatively long notch 88 formed in the bar 60. It will be noted that the recess 1 in the guide plate 40 is longer than the recesses 3 and 5 to accommodate the rearward movement of the hand lever 36 into first speed. As seen in Figure 8 the power is then transmitted from the countershaft to the driven shaft by the meshing gears 23 and 34.

Figure 9:
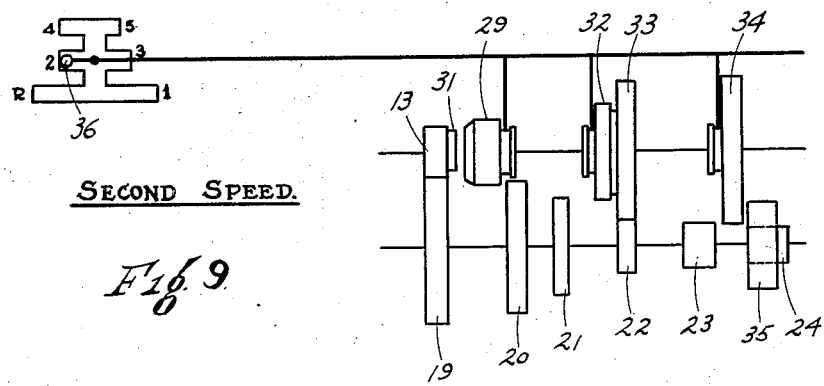

The arrangement of the parts in second speed are shown in Figure 9. The hand lever is withdrawn from the recess 1, returning the parts to their neutral positions as shown in Figure 2, and is then moved to the right to rock the shaft 41 in a counter clockwise direction into the position shown in Figures 3, 4 and 5. The hand lever is then pushed forwardly into the recess 2 in the guide plate causing the shaft 41 to slide rearwardly and carrying with it the fork 66; the forks 51 and 67 remaining in neutral position. This movement of the fork 66 is continued until the ball 81 engages the groove 83 and causes the gear 33 to mesh with the gear 22 so that the power is transmitted from the countershaft to the driven shaft through these gears.

Figure 10:
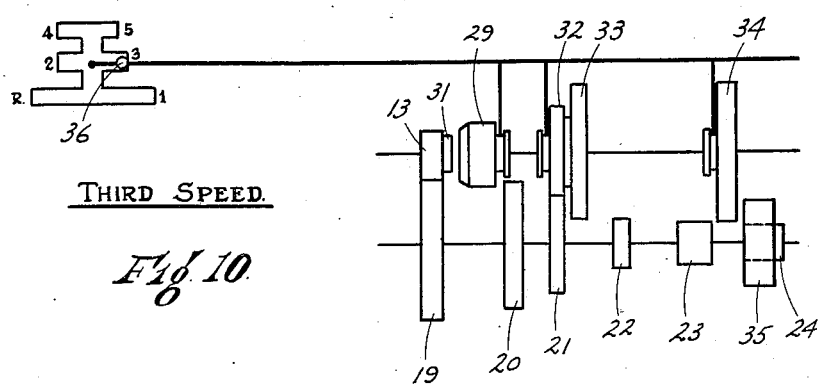

As shown in Figure 10 the hand lever is then moved directly rearwardly to set the transmission in third speed. This movement of the hand lever carries the shaft 41 and fork 66 forwardly so that the gear 32 engages with the gear 21, and the ball 81 engages the groove 86.

Figure 11:
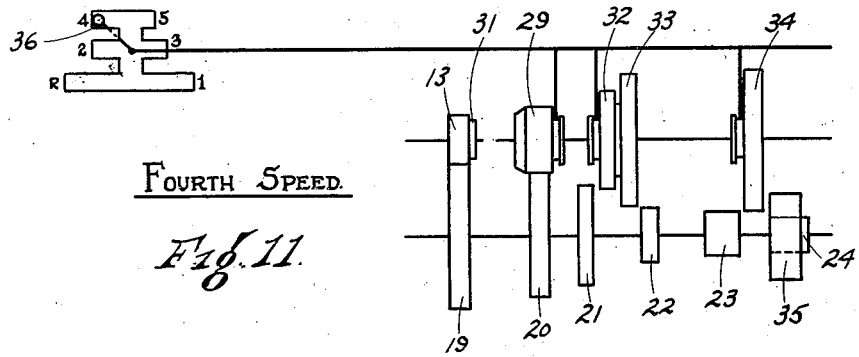

As shown in Figure 11 fourth speed is obtained by rocking the hand lever to the right from its neutral position and pushing it forwardly into the recess 4. The rocking of the hand lever to the right moves the shaft 41 in a counter clockwise direction as seen in Figures 3, 4 and 5 causing the notch 65 to register with the bar 60, and moving the splines 47 to positions in which they are in alignment with the projections 59 and out of alignment with the projections 72 and 77. Forward movement of the hand lever 36 then causes rearward movement of the shaft 41 carrying the fork 51 rearward so that the gear 29 engages with the gear 20 on the countershaft. For this speed the ball 81 engages with the groove 83 as in second speed, since the hand lever is moved forwardly the same distance from its neutral position for second and fourth speeds.

Figure 12:
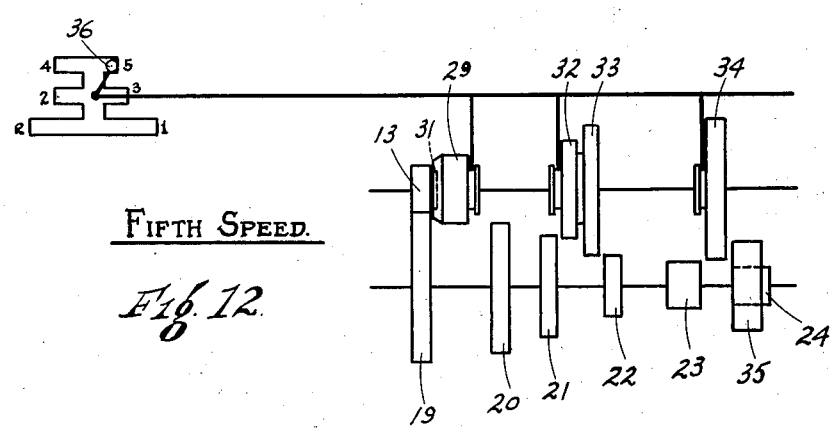

Fifth speed is obtained by moving the hand lever directly rearwardly into the recess 5 as shown in Figure 12. The corresponding forward movement of the shaft 41 carries the fork 51 forwardly so that the clutch teeth 30 on the gear 29 engages with the clutch 31 on the gear 13 to directly couple the driving shaft and driven shaft. In this speed the ball 81 engages in the groove 85.

Figure 13:
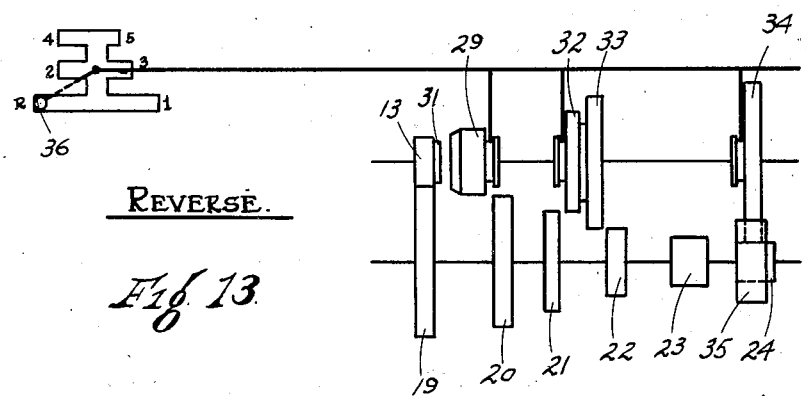

As shown in Figure 13 the transmission is set in reverse by moving the hand lever directly forwardly from its position in first speed into the recess R. This movement slides the shaft 41 and the fork 67 rearwardly to mesh the gear 34 with the reverse idler gear 35 so that the power is transmitted from the countershaft to the driven shaft through the three gears, 24, 35 and 34. In this speed the ball 81 engages in the recess 82 in the shaft 41.

The forward or rearward movement of the shaft 41 in second, third, fourth and fifth speeds is limited by the opposite ends of the notch 61 which engage the collars 58 and 71, and by the engagement of the forks 51 and 66 with each other. It will also be seen that the hand lever 36 cannot be moved forwardly or rearwardly from its neutral position until it has been turned to one of the three positions in which the notches 65, 74 and 80 register with the bar 60, and that after movement of the shaft 41 in either direction has been started it can not be rotated by reason of the engagement of one of these three notches with the side edges of the bar 60.

The arrangement disclosed permits the mounting and selective operation of a plurality of shifter forks on a single shaft, it being only necessary to provide angular positions for the shifter forks in which some of the forks are locked to the shaft for sliding movement therewith and the remaining forks are locked by the bar against sliding movement. It is to be understood that any desired number of forks can be used, that the arrangement disclosed may be applied to a key transmission to shift clutches to engage the different gears instead of shifting the gears themselves if desired, and that various other modifications and re-arrangements of parts may be resorted to without departing from the scope of the following claims.

I claim:

1. In a transmission having a shiftable element, a shaft having splines thereon, a shifter fork bearing upon said splines and having inwardly extending projections of substantially less angular extent than the angular extent of the spaces between the splines on said shaft, whereby said shaft may occupy a plurality of different angular positions with said projections engaged between said splines.

2. In a transmission having shiftable elements, a slidable and rotatable actuating shaft having a longitudinally extending spline thereon, a shifter fork freely mounted on said shaft and having an inwardly extending projection, said spline being interrupted and said projection being arranged to pass through said interruption into alignment with said spline.

3. In a transmission having shiftable elements, a slidable and rotatable actuating shaft having spaced interrupted splines thereon, and a shifter fork freely mounted on said shaft and having inwardly extending projections arranged in one position of said shaft to pass between said splines to permit relative sliding movement of said fork and said shaft and in another position of said shaft to extend into the interruption in said splines to lock said shaft and fork together for sliding movement.

4. In a transmission having shiftable elements, a slidable and rotatable actuating shaft having spaced splines interrupted at spaced points, a plurality of shifter forks freely mounted on said shaft, each of said forks having inwardly extending projections adapted in one angular position of said shaft to pass between said splines to permit relative sliding of said shaft and fork and in another angular position of said shaft to engage in an interruption in said splines to lock said shaft and forks together for sliding movement.

5. In a transmission having shiftable elements, a slidable and rotatable actuating shaft having spaced splines thereon interrupted at spaced points, a plurality of spaced shifter forks freely mounted on said shaft, each of said shifter forks having inwardly extending projections adapted in one angular position of said shaft to extend into interruptions in said splines to lock said fork to said shaft for sliding movement, and adapted in a plurality of other angular positions of said shaft to extend into the spaces between said splines to permit relative sliding movement of said fork and shaft.

6. In a change speed transmission having a housing and a shiftable element therein, a rotatable shaft extending into said housing, a shifter fork freely mounted on said shaft, means mounted on said shaft for rotation therewith independent of said fork and held by said fork against sliding movement with respect thereto, and a projection on said housing co-operating with said means to retain said fork against sliding movement with respect to said housing in one angular position of said shaft and to permit such sliding movement in another angular position of said shaft.

7. In a change speed transmission having a housing and a plurality of shiftable elements therein, a rotatable shaft extending into said housing, a plurality of shifter forks freely mounted on said shaft, a collar on said shaft adjacent each of said shifter forks, each of said collars being mounted for rotation with said shaft and being held by its respective fork against sliding movement with respect thereto, and means carried by said housing and co-operating with each of said collars to retain each collar against sliding movement with respect to the housing in one angular position of the shaft and to permit such sliding movement in another angular position of the shaft.

8. In a change speed transmission having a housing and a plurality of shiftable elements therein, a rotatable shaft extending into said housing, a plurality of shifter forks freely mounted on said shaft, a collar on said shaft adjacent each of said shifter forks, each of said collars being mounted for rotation with said shaft and being held by its respective fork against sliding movement with respect thereto, and means carried by said housing and co-operating with each of said collars to permit sliding movement of each collar with respect to the housing in one angular position of the shaft and to prevent such sliding movement in any other angular position of the shaft.

9. In a change speed transmission having a housing and shiftable elements therein, a rotatable shaft extending into said housing, a shifter fork having a pair of spaced bearings rotatable on said shaft, a collar keyed to said shaft and retained between said bearing, a bar carried by said housing and having a notch receiving said collar to prevent sliding movement of said collar and said fork with respect to said housing, and said collar having a notch therein arranged to register with said bar to permit such sliding movement.

10. In a change speed transmission having a housing and shiftable elements therein, a slidable and rotatable actuating shaft extending into said housing, a shifter fork freely mounted on said shaft, means on said shaft and said fork for selectively locking said fork to said shaft for sliding movement therewith or releasing said fork from said shaft depending on the angular position of said shaft, and a collar mounted on said shaft for rotation therewith and held against sliding movement with respect to said fork and means on said housing co-operating with said collar for locking said fork against sliding movement with respect to said housing or releasing said fork for such movement depending on the angular position of said shaft.

11. In a change speed transmission having a housing and a shiftable element therein, a slidable and rotatable shaft extending into said housing, a shifter fork slidably and rotatably mounted on said shaft, said shaft having interrupted splines thereon and said fork having projections arranged to bear between said splines or to engage within the interruptions in said splines, a collar carried by said shaft for rotation therewith and held against sliding movement with respect to said fork, and means for selectively locking said collar against sliding movement with respect to said housing or releasing said collar for such sliding movement controlled by the angular position of said shaft, said means being positioned in such a manner that said collar is released for sliding movement only when said projections are engaged within the interruptions in said splines.

12. In a transmission having shiftable elements a slidable and rotatable actuating shaft having a longitudinally extending spline thereon, a shifting fork having a portion extending around said shaft, said portion being formed with an inwardly extending projection, said spline being interrupted and said projection being arranged to pass through said interruption into alignment with said spline.

FRANCIS M. VANDERVOORT.